(12) United States Patent
Fong et al.

(10) Patent No.: US 6,934,101 B2
(45) Date of Patent: Aug. 23, 2005

(54) METHOD AND APPARATUS USING REVERSE DISK ROTATION TO ACHIEVE SLIDER CONTACT WITH A DISK SURFACE

(75) Inventors: Walton Fong, San Jose, CA (US);
Donald R. Gillis, San Jose, CA (US);
Remmelt Pit, Cupertino, CA (US);
Kris Schouterden, San Jose, CA (US);
Mike Suk, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 123 days.

(21) Appl. No.: 10/607,599

(22) Filed: Jun. 27, 2003

(65) Prior Publication Data

US 2004/0264020 A1 Dec. 30, 2004

(51) Int. Cl.$^7$ .............................................. G11B 27/36
(52) U.S. Cl. ........................................ 360/31; 360/74.1
(58) Field of Search ...................... 360/31, 74.1, 97.02, 360/237.1, 130.34; 324/210, 212; 369/71, 72; 451/8, 28, 317, 318; 29/603.16, 90.01, 603.01, 603.07, 603.08, 603.09

(56) References Cited

U.S. PATENT DOCUMENTS

| | | | |
|---|---|---|---|
| 5,086,360 A | | 2/1992 | Smith et al. |
| 5,126,992 A | * | 6/1992 | Lavinsky et al. .............. 369/71 |
| 5,658,191 A | | 8/1997 | Brezoczky |
| 5,863,237 A | | 1/1999 | Felts et al. |
| 6,419,551 B1 | | 7/2002 | Smith |
| 6,493,184 B1 | | 12/2002 | Smith |
| 2001/0021412 A1 | | 9/2001 | Watanabe et al. |
| 2002/0029448 A1 | | 3/2002 | Duan et al. |
| 2002/0067574 A1 | | 6/2002 | Gillis et al. |

FOREIGN PATENT DOCUMENTS

JP 6052543 A 2/1994

OTHER PUBLICATIONS

Edward Kral, et al., "Adjustable Burnish Slider Using Thermal Expansion for HDD Applications", Research Disclosures, Sep. 2001, p. 1578, n449 Article 129.
T. Endoh, et al., "Zoned Low Round Per Minute Burnishing", IBM Technical Disclosure Bulletin, Feb. 1996, vol. 39 No. 02.
P. Calcagno, et al., "Reverse Process Burnishing Method for Disk Surfaces", IBM Technical Disclosure Bulletin, Feb. 1994, vol. 37 No. 02A.
IBM, "Data Recovery Method", Research Disclosures, Apr. 2000p. 745 Article 432116.

* cited by examiner

Primary Examiner—Alan T. Faber
(74) Attorney, Agent, or Firm—G. Marlin Knight

(57) ABSTRACT

A method for burnishing a slider in a disk drive in which the disk is rotated in the opposite or reverse direction from that used to develop the air-bearing and to read and write data is described. Rotating the disk in the reverse direction results in no air-bearing being formed and the slider being in contact with the disk surface. The burnishing removes material over the magnetic transducers in the slider which separate the transducers from the disk resulting in greater sensitivity. Optionally the stopping point for burnishing can be determined by monitoring measurable parameters such as the change in the MR resistance (MRR), i.e., $\Delta MRR/MRR$ until a selected range is achieved. The invention can be used to remove an overcoat from the air-bearing surface of the slider, remove protruding areas from the slider and to remove debris from the disk surface.

24 Claims, 4 Drawing Sheets

METHOD AND APPARATUS USING REVERSE DISK ROTATION TO ACHIEVE SLIDER CONTACT WITH A DISK SURFACE

FIELD OF THE INVENTION

The invention relates to the field of magnetic data storage device design, fabrication and operation and more particularly to burnishing methods for sliders and cleaning methods for disks for use in magnetic data storage devices.

BACKGROUND OF THE INVENTION

The relevant components in a typical prior art magnetic storage device (disk drive) 10 are illustrated in FIG. 1 in simplified block form. Although only one disk 16 and one slider 11 are shown, there may be multiple disks in a drive and typically there are two sliders per disk, i.e., one for each surface of the disk. This disk drive comprises a thin film magnetic disk 16 for recording data, a slider 11 that carries out the reading and writing of data in tracks on the magnetic disk 16. An arm electronics (AE) module 17 has circuits that, among other functions, provide bias for read head (not shown) and amplify the signals from the read head. The arm electronics (AE) module 17 is controlled by a read/write (R/W) channel 18 that carries out the reading of servo sectors and the reading and writing of data. A rotary actuator 12 moves the arm 22 and the attached slider 11 in an arcuate path approximately along a radius of the magnetic disk 16 to read and write data in circular tracks around the disk as the disk is being rotated by a spindle motor (not shown) which rotates spindle 24. The direction of rotation is shown with the slider and arm pointing in the direction of rotation, i.e., a selected point on the rotating disk first passes under the arm 22, then passes under the slider 11. This orientation between the arm/slider and the direction of rotation causes the air-bearing to form and will be referred to as the forward or operational direction. The operational direction can be clockwise as shown in FIG. 1 or it can be counterclockwise in which case the arm/slider would appear on the opposite side of the spindle 24. The operational direction is fixed by the design of the drive. The drive 10 includes a load/unload ramp structure 26 which lifts the arm to in turn lift the slider off of the disk when the arm is rotated out to the outer diameter (OD). A crash-stop 28 prevents the arm from rotating too close to the spindle. A spindle motor driver 14 under the direction of the hard disk controller (HDC) 20 controls the direction and speed of rotation. The spindle motor driver 14 includes circuitry that drives the coils of the spindle motor individually and thereby has highly flexible control over the spindle motor. The HDC 20 is a programmable device which executes instructions stored in the program in memory 19. The microprocessor unit (MPU) 21 has a processor, memory, an interface to external apparatus, and the like, and controls communication with the host apparatus (not shown).

FIG. 2 illustrates a partial section of a particular embodiment of a slider 11 having a write head 11W and a read head 11R. The read head 11R reads magnetic transitions as the disk rotates under the air-bearing surface (ABS) of the slider 11. The view is at the point in the fabrication when the wafer has been sawed along the line labeled "ABS" and before any of the air-bearing features or the overcoat has been fabricated. The components of the read head 11R are the first shield (S1), two insulation layers 107, 109 which surround the sensor element 105 (also called the MR-stripe) and the second shield 101 (P1/S2). The MR-stripe can be composed of a single layer or of multiple layers of varying materials. The term "stripe height" refers to the dimension of the sensor element 105 measured from the ABS to the opposite end of the element. Controlling the stripe height is important for the response of the read head to magnetic fields originating in the thin films on the disk. This type of slider is called a "merged head" because the P1/S2 layer 101 serves as a shield for the read head 11R and a pole piece for the write head 11W. The yoke also includes another pole piece P3 103 which connects with P1/S2 101. The P2 102 confronts the P1/S2 101 across the write gap layer 43 to form the write gap at the air-bearing surface (ABS). The zero throat height (ZTH) is defined as the distance from the ABS to the point where the P3 separates from the gap layer by forming a step on the gap layer 43. Control over the ZTH is one of the limitations encountered when attempts are made to reduce the track width of this type of write head 11W. One technique for controlling the ZTH and the stripe height is to make the cut slightly beyond where the final ABS should be and then the lap the ABS to precisely remove material until the desired plane is reached.

In the typical manufacturing process for sliders 11 for magnetic storage devices 10, a large number of sliders are fabricated from a single wafer having rows and columns of the magnetic transducers which are deposited simultaneously on the wafer surface using semiconductor-type process methods. In various process embodiments, further processing must occur after the wafer is sliced into rows or individual sliders to expose the transducer elements. The sliders are then processed to form the protective layers and air-bearing surface features. Typically, a slider is formed with an aerodynamic pattern of protrusions (air-bearing features) on the air-bearing surface (ABS) which enable the slider to fly at a constant height close to the disk during operation of the disk drive. The recording density of a magnetic disk drive is limited by the distance between a transducer and the magnetic media. One goal of air-bearing slider design is to "fly" as closely as possible to the magnetic medium while avoiding excessive physical impact with the medium. Smaller spacing or "fly height" is desired so that the transducer can distinguish between the magnetic fields emanating from closely spaced regions on the disk. After all of the features have been formed each slider has a read and write head terminating at the ABS covered by an overcoat layer which is commonly a carbon-based material.

The manufacturing process for magnetic disks 16 for use in disk drives typically includes burnishing using a special burnishing head. Published U.S. patent application 2002/0029448 describes this process and includes a description of a burnishing head. This burnishing during manufacturing of the disk is to be distinguished from burnishing which can be performed after the disk is installed in the drive. In U.S. Pat. No. 6,419,551 to G. Smith burnishing in a completed disk drive is achieved by the use of an external vacuum source which is applied to the disk drive to lower the flying height of the slider below the operational level even though the rotational rate has been increased. For disk drives being operated in normal customer environments a vacuum source is not available, so lowered rotational speed can be used to lower the flying height and burnish high spots on the disk. One described burnishing scheme uses heat generated by the electrical components in magnetic transducer to cause a physical protrusion at the rear of the slider to accomplish disk burnishing.

A process of burnishing so-called "textured disks" has been described by P. CALCAGNO, et al., in "Reverse Process Burnishing Method for Disk Surfaces", IBM Technical Disclosure Bulletin, 02-1994, vol. 37 no. 02A. They note that the texturing process, which involves rotating the disk while an abrasive material or surface is held against the disk surface, tends to leave burrs on the back side of the texture grooves. If the burnishing process is performed with the disk rotating in the opposite direction from that used for texturing, the burrs will tend to be folded into the grooves and, therefore, made less obtrusive. It should be noted that the rotational direction for texturing and burnishing in this context have no relationship to the direction that the disk will be rotated in when installed in a disk drive.

Burnishing can also be performed on the slider 11 after it is installed in a drive. For example, U.S. Pat. No. 6,493,184 to G. Smith describes a disk design which includes dedicated burnishing zones that are rougher than the rest of the disk and can be used to burnish the slider in a disk drive.

In order to improve performance of magnetic storage devices, there is a need for improved methods of burnishing sliders.

SUMMARY OF THE INVENTION

One embodiment of the invention is a method for burnishing a slider in a disk drive in which the disk is rotated in the opposite or reverse direction from that used to develop the air-bearing and to read and write data. Rotating the disk in the reverse direction results in no air-bearing being formed and the slider being in contact with the disk surface. The burnishing removes material over the magnetic transducers in the slider which separate the transducers from the disk resulting in greater sensitivity. Contact with the disk achieves rapid burnishing of the slider without damaging the disk. Optionally the stopping point for burnishing in this embodiment or any of the alternative embodiments described below can be determined by monitoring measurable parameters such as the change in the MR resistance (MRR), i.e., ΔMRR/MRR until a selected range is achieved. In another embodiment the slider is first burnished by rotating the disk in the backward direction to achieve a high burnish rate followed by burnishing in the forward direction to achieve a slower burnishing rate for increasing precision in detecting the proper stopping point. Optionally vacuum may be applied to the disk drive in conjunction with forward rotation to lower the flying height and increase the burnishing rate.

In another embodiment, the burnishing techniques of the invention are used to remove material, such as an overcoat, from the air-bearing surface of the slider which separates the magnetoresistive element from the magnetic medium. If the substrate of the slider protrudes above the elements of the read head, the burnishing can be continued until the substrate has been abraded to be substantially coplanar with the elements of the read head. Optionally the magnetic recording disk may have a dedicated burnishing zone for burnishing the slider.

In another embodiment, the slider is used to remove debris from the disk surface by sweeping the slider over the disk surface while the disk is being rotated in the non-air-bearing direction.

DETAILED DESCRIPTION OF THE INVENTION

The air-bearing features of sliders are typically classified as positive pressure or negative pressure types. With either type, the air-bearing forms only when the disk is being rotated under the slider in the designated operational ("forward") direction. The applicants have discovered that rotating the disk in backward or reverse direction allows the slider to be in contact with the disk, since no air-bearing is formed. The following will use the term "contact" to describe the relationship between the slider and the disk even though at high rotation rates there may be some periodic separation. The applicants use the slider contact with the disk to achieve a rapid burnishing of the slider without damaging the disk.

Figure 1:
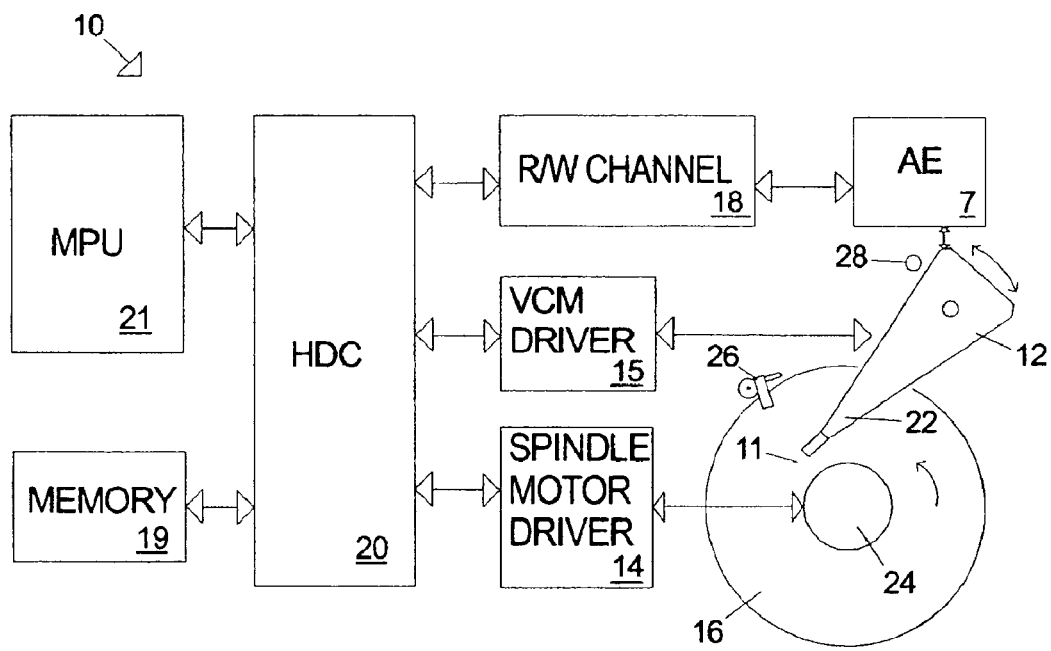
FIG. 1 illustrates relevant components in a typical prior art disk drive in simplified form.
Figure 2:
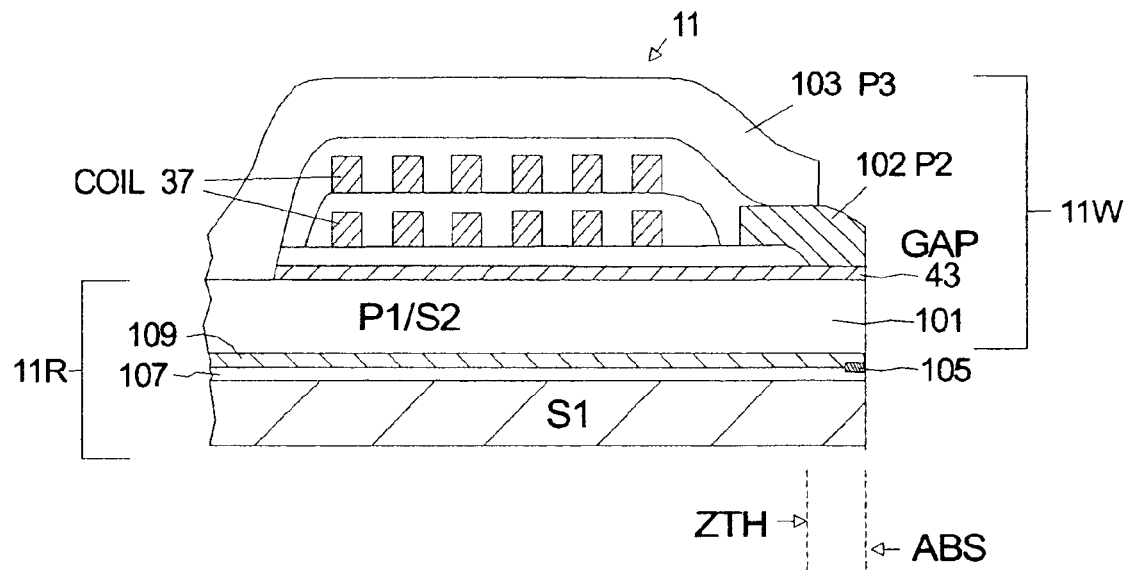
FIG. 2 illustrates a section view of a prior art slider including components of the write head and the read head.

Typical spindle motors used in disk drives are highly controlled by the electronics and programming code, also called microcode or firmware, stored in the memory 19 shown in FIG. 1. The rate, duration and sequence of the pulses applied to the coils of the spindle motor are programmable and as a result may be operated in either rotational direction and at any speed up to the system maximum by straightforward changes in the microcode for the HDC 20. Therefore, implementation of the reverse rotation and speed variation aspects of embodiments of the invention can be achieved by modifying the microcode using known techniques.

Figure 5:
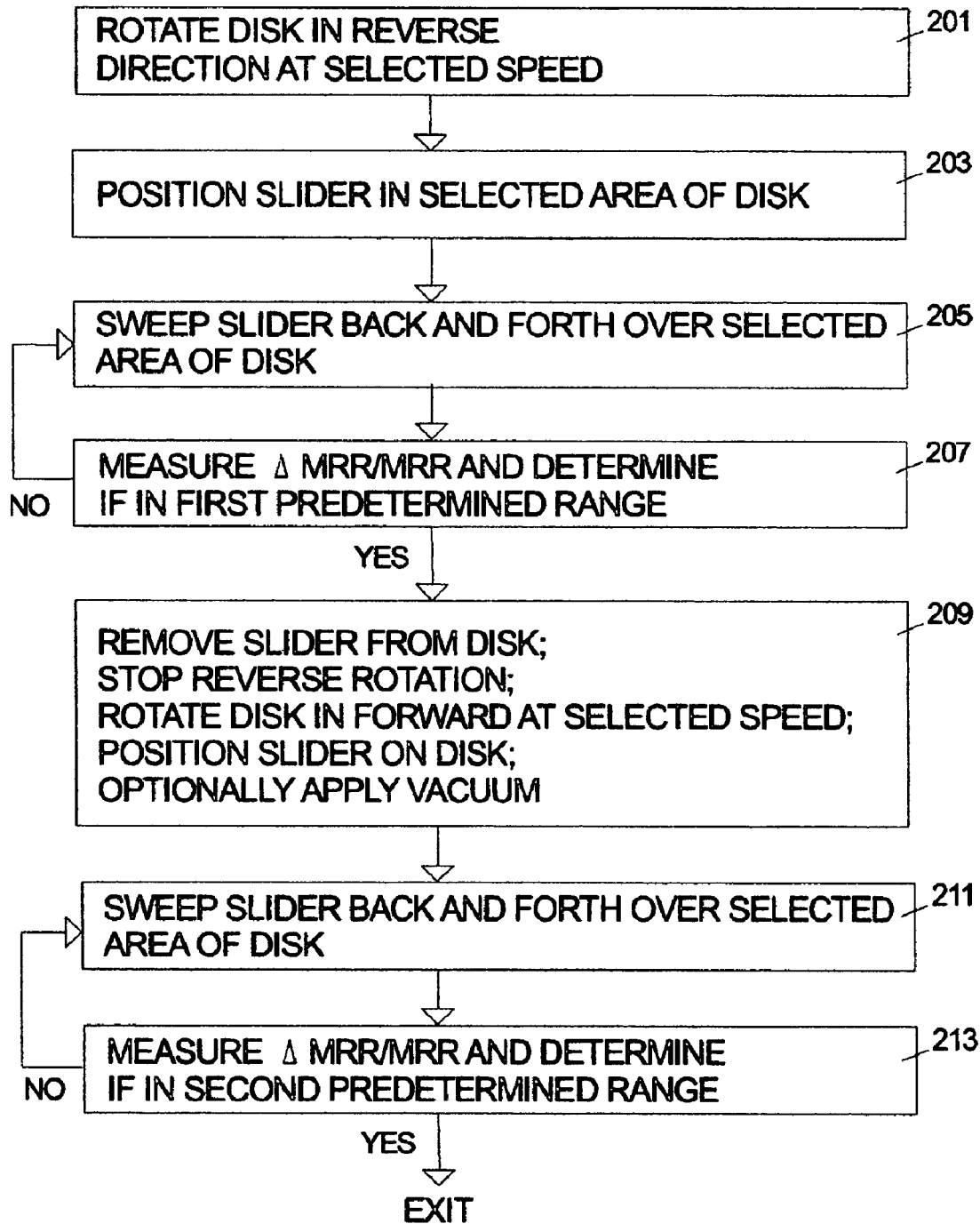
FIG. 5 is a flow chart of a method according to the invention of burnishing a slider using reverse rotation.

FIG. 5 is a flow chart of a method according to the invention of burnishing a slider. The disk is first bought up to a selected speed rotating in the reverse direction, i.e., opposite from the direction of normal operation 201. The slider(s) is moved onto the disk into the area selected for burnishing on the disk 203. Either all or a portion of the accessible surface of the disk can be used for the slider burnishing. A dedicated burnishing zone at the ID or OD can be used which can be an area that would be blocked from use during normal operation by either the crash-stop or the load/unload ramp which can be removed or compressed in the case of a resilient crash-stop. The slider is preferably swept back and forth over the selected area on the disk surface during the burnishing to avoid heat buildup that could be damaging to disk. In order to determine when the burnishing has removed the desired amount of material it is preferable that the relative change in the MR resistance, i.e., ΔMRR/MRR be measured at least periodically during the burnishing process and compared against a predetermined range of values to determine the point of completion. As long as the ΔMRR/MRR is outside of the range, then the sweeping of the slider back and forth is continued 205. When the ΔMRR/MRR falls in desired range, this phase of the process is completed 207. The sweeping and measuring steps can be implemented as sequential steps or then can be implemented as tasks which in effect run concurrently. The burnishing process can be terminated at the point where the target value for the reverse rotation has been achieved or optionally continued with a forward burnishing step to achieve a finer finish and better control over the precise end point. The reverse rotation achieves burnishing at a relatively high rate, but forward burnishing is relatively slow which allows the more precise control. In order to change the rotational direction of the disk, the slider is removed from the disk before stopping the rotation. The disk is then spun up in the forward, operational direction to the selected speed and the slider is again moved on the disk 209. When operated under normal conditions no slider burnishing will occur; therefore, some additional step has to be taken to get the slider to fly low enough that some burnishing will take place when the slider contacts high spots on the disk. Vacuum may be applied to disk and slider which as noted results in a lower flying height. A specially designed slider can be employed which flies at a lower height when the rotational speed is increased above the selected operational speed. The slider design is outside of the scope of this application, but can be readily achieved using prior art principles.

Figure 3:
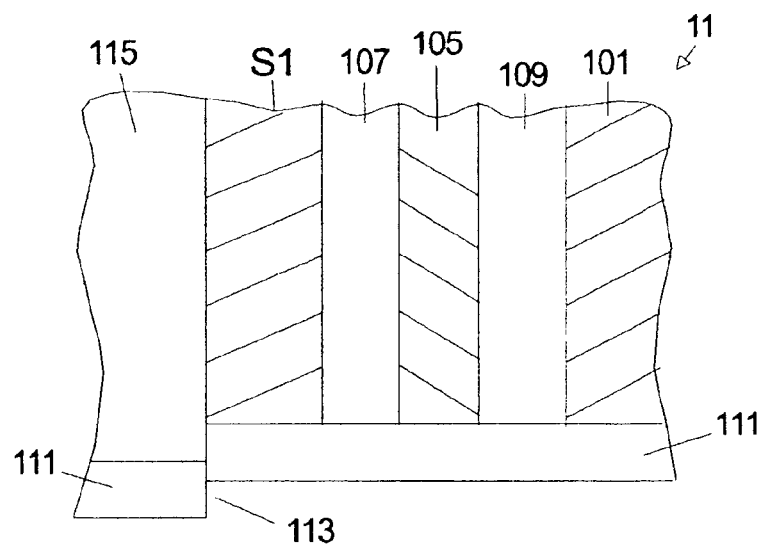
FIG. 3 illustrates a section view of a prior art slider including selected components of the read head, including a carbon overcoat, showing the recession that occurs in the MR stripe and surrounding materials relative to the substrate.
Figure 4:
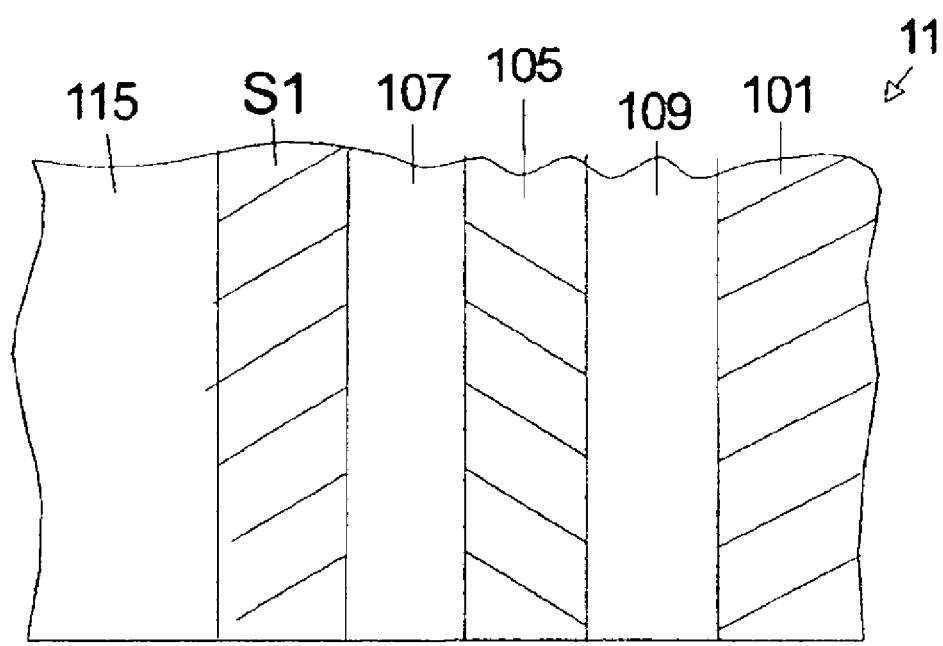
FIG. 4 illustrates a section view of a slider including selected components of the read head that has been burnished according to the invention to remove the recession and carbon overcoat shown in FIG. 3.

FIG. 3 illustrates a section view of a prior art slider including selected components of the read head including a thin film overcoat 111 which is typically carbon, but many other protective materials have been proposed and/or used. In this enlarged view recessed area 113 in is shown. The recession is due to the fact that the materials used for the thin film that comprise the read and write heads tend to be softer than the substrate material 115. (Equivalently, the substrate 115 can be said to protrude above the magnetic transducer components or that there is a nonplanar discontinuity between the substrate and magnetic transducer components on the ABS.) A typical substrate material, "N58" ($Al_2O_3$—TiC), is harder than the alumina which is commonly used for the thin film insulating layers. The metal alloys used for the magnetoresistive stripe, shields and pole pieces, tend to be even softer than alumina. When the air-bearing surface of the slider is lapped as part of the fabrication process, the thin film materials wear away more quickly than the N58 substrate and the recessed area results. The recessed area is undesirable since it reduces the sensitivity of the magnetoresistive material to the fields in the magnetic thin films on the disk (not shown) by causing the MR-stripe 105 to be recessed. When the overcoat 111 is deposited subsequent to lapping, the thin film conforms to the recessed area and, therefore, does not change the topography. The thickness of the overcoat also adds to the separation between the MR-stripe and the magnetic thin films on the disk and therefore, reduces the ultimate sensitivity. The slider burnishing method of the invention can be used to either thin or completely remove the overcoat separating the MR-stripe from the media. If the burnishing is continued long enough, then the recessed area in the MR-stripe can be removed as well. FIG. 4 illustrates a similar section of a slider as in FIG. 3, but in this case the slider has been burnished according to the invention. The burnishing has been continued until the entire overcoat over the MR-stripe has been removed and substrate 115 has been abraded away, so that the surface is essentially coplanar with the surfaces of the elements of the read head, S1 and the MR-stripe 105, etc. The result is that the local ABS area surrounding the MR-stripe has been substantially planarized to allow the MR-stripe to be positioned closer to the magnetic media than was the case without the burnishing as taught herein. The reverse rotation burnishing of the invention can be continued for a selected time, a selected number of rotations or until a measured parameter falls into a selected range.

In an experiment on reverse rotation burnishing the applicants used a disk drive with an operational rotation rate of 10K rpm. The read head initially had a $\Delta MRR/MRR$ of zero since no changes had occurred in the stripe height. It should be noted that prior art techniques can be used to determine the $\Delta MRR/MRR$ using the drive's hardware and microcode. The disk was first rotated at 6K rpm in the forward direction for 60 minutes and the $\Delta MRR/MRR$ remained at zero indicating that no significant burnishing of the slider had occurred. The disk was then rotated in the reverse direction for 3 minutes at which time the $\Delta MRR/MRR$ climbed to approximately 0.093 signaling that burnishing was occurring at a rapid rate. Despite the rapid burnishing of the slider, the disk was not damaged in this experiment. The disk did not have a dedicated burnishing zone; therefore, during the reverse rotation the slider (which was approximately 1 millimeter wide) was swept back and forth over a 5 millimeter area of the disk. Neither the thin films nor the lube on the disk were damaged. Sweeping the slider over some area wider than the slider aids in dissipating heat buildup which can be damaging to the disk.

Although the reverse burnishing did not damage the disk in experiments, optionally the magnetic recording disk may have at least one dedicated burnishing zone for burnishing the slider. The dedicated burnishing zone can be located at the outer diameter (OD) or inner diameter (ID) of the disk. The OD burnishing zone may be at a location which is normally inaccessible to the slider because a load-unload ramp is located in a position which slightly overlaps the OD of the disk. This OD burnish zone is used by temporarily removing the load-unload ramp. The ID burnishing zone may also be at a location which is normally inaccessible to the slider because of a crash-stop which is located in a position which stops the actuator arm slightly outside of the ID of the disk. This ID burnish zone is used by temporarily removing the crash-stop or compressing it if it is made of resilient material.

In another embodiment, the burnishing techniques of the invention are used to remove debris from the disk surface by sweeping the slider over the disk surface while the disk is being rotated backwards ("reverse rotation sweeping"). Since the slider is in contact with the disk during reverse rotation it is particularly effective in mechanically capturing debris which can then be removed from the disk. Preferably the slider is moved slowly from the ID to OD. Multiple sweeps may be needed. This technique can be used as a part of the manufacturing process for disks where the dedicated slider in a processing station can be replaced periodically as wear and or the accumulation of debris becomes excessive. This technique can also be used in an assembled disk drive. Although the debris tends to cling to the slider, experiments have shown that this does not impair its operation.

Embodiments of the invention can be implemented to be performed in the completed drive in the field, as well as, during the manufacturing process. The microcode can be designed to execute the methods on a manual command from a host computer, through a maintenance port or as a part of a larger set of steps performed by the drive periodically or in response to errors.

The foregoing detailed description is provided for specific embodiments of the invention and should not be taken as limitations on the invention.

What is claimed is:

1. A disk drive which reads data while a disk is rotating in a forward direction comprising:
   a spindle motor that selectably rotates a disk in the forward or a reverse direction;
   a slider with air-bearing features on an air-bearing surface, the air-bearing features being designed to develop an air-bearing when the disk is rotated in the forward direction; and a controller that selectably burnishes the area of the air-bearing surface where a magnetic transducer is located by rotating the disk in the reverse direction for a plurality of rotations.

2. The disk drive of claim 1 wherein the controller selectably burnishes at least the area of the air-bearing surface where magnetic transducer is located by rotating the disk in the forward direction for a plurality of rotations after rotating the disk in the reverse direction for a plurality of rotations.

3. The disk drive of claim 1 wherein the controller measures a parameter of a magnetic transducer in the slider while the burnishing is being performed and terminates the burnishing when the parameter falls into a selected range.

4. The disk drive of claim 3 further the parameter is ΔMRR/MRR.

5. The disk drive of claim 1 wherein the slider has an overcoat over the magnetic transducer before the burnishing has been performed and wherein the burnishing continues until the overcoat has been substantially reduced in thickness over the magnetic transducer.

6. The disk drive of claim 1 wherein the slider has an overcoat over the magnetic transducer before the burnishing has been performed and wherein the burnishing step continues until the overcoat has essentially been removed over the magnetic transducer.

7. The disk drive of claim 1 wherein the slider has a nonplanar discontinuity between a substrate and components of a magnetic transducer on the air-bearing surface before the burnishing has been performed and wherein the burnishing continues until the nonplanar discontinuity has been reduced.

8. The disk drive of claim 1 wherein the slider has a nonplanar discontinuity between a substrate and components of a magnetic transducer on the air-bearing surface before the burnishing step has been performed and wherein the burnishing step continues until the nonplanar discontinuity has essentially been removed.

9. The disk drive of claim 1 wherein the burnishing further comprises repeatedly sweeping the slider over a range of positions on the disk surface to reduce disk damage.

10. The disk drive of claim 1 further comprising an arm to which the slider is attached and a compressible crash-stop and where the controller positions the slider on an area on the disk not used for storing data by urging the arm against the crash-stop to compress the crash-stop.

11. The disk drive of claim 1 further comprising a removable crash-stop and where the controller positions the slider on an area on the disk not used for storing data by moving the arm into the crash-stop position so that the slider is on an area on the disk not used for storing data.

12. A method of burnishing a slider having air-bearing features that develop an air-bearing when a disk is rotated under the slider in a forward direction, comprising the steps of:

rotating the disk in a reverse direction that is opposite to the forward direction; and burnishing at least part of the air-bearing surface of the slider by positioning the air-bearing surface of the slider on a surface of the disk for a plurality of rotations while disk is rotating in the reverse direction.

13. The method of claim 12 wherein the step of burnishing is followed by the step of burnishing the air-bearing surface of the slider by rotating the disk in the forward direction for a plurality of rotations while the slider is flying lower than an operational height.

14. The method of claim 12 further comprising measuring a parameter of a magnetic transducer in the slider while the burnishing step is being performed and terminating the burnishing step when the parameter falls into a selected range.

15. The method of claim 14 wherein the parameter comprises ΔMRR/MRR.

16. The method of claim 12 wherein the slider has an overcoat over a magnetic transducer on the air-bearing surface before the burnishing step has been performed and wherein the burnishing step continues until the overcoat has been substantially reduced in thickness over the magnetic transducer.

17. The method of claim 12 wherein the slider has an overcoat over a magnetic transducer on the air-bearing surface before the burnishing step has been performed and wherein the burnishing step continues until the overcoat has essentially been removed over the magnetic transducer.

18. The method of claim 12 wherein the slider has a nonplanar discontinuity between a substrate and components of a magnetic transducer on the air-bearing surface before the burnishing step has been performed and wherein the burnishing step continues until the nonplanar discontinuity has been reduced.

19. The method of claim 12 wherein the slider has a nonplanar discontinuity between a substrate and components of a magnetic transducer on the air-bearing surface before the burnishing step has been performed and wherein the burnishing step continues until the nonplanar discontinuity has essentially been removed.

20. The method of claim 12 wherein the burnishing step further comprises sweeping the slider over a range of positions on the disk surface to reduce disk damage.

21. The method of claim 12 further comprising positioning the slider during burnishing on a predetermined area on the disk not used for storing data by compressing a crash-stop.

22. The method of claim 12 further comprising removing a crash-stop to allow the slider to move to a predetermined area on the disk not used for storing data.

23. The method of claim 12 further comprising removing a load-unload ramp to allow the slider to move to a predetermined area on the disk not used for storing data.

24. A method of cleaning debris from a thin film disk:

rotating the disk;

positioning an air-bearing surface of a slider on a disk surface, the slider having air-bearing features on the air-bearing surface that are designed to develop an air-bearing when the disk is rotated under the air-bearing features in a first direction, the slider being orientated on the disk with the disk rotating in a second direction opposite from the first direction so that the air-bearing does not develop; and removing debris from the disk surface by sweeping the slider over selected areas of the disk surface while the disk is rotating in the second direction.

* * * * *